(12) United States Patent
Matulin

(10) Patent No.: US 9,021,750 B1
(45) Date of Patent: May 5, 2015

(54) PORTABLE MODULAR TORNADO AND HURRICANE SURVIVAL SHELTER KIT

(71) Applicant: Frederick Matulin, Tucson, AZ (US)

(72) Inventor: Frederick Matulin, Tucson, AZ (US)

( * ) Notice: Subject to any disclaimer, the term of this patent is extended or adjusted under 35 U.S.C. 154(b) by 0 days.

(21) Appl. No.: 14/591,212

(22) Filed: Jan. 7, 2015

(51) Int. Cl.
| | | |
|---|---|---|
| *E04B 1/343* | (2006.01) | |
| *E04B 1/32* | (2006.01) | |
| *E04B 1/342* | (2006.01) | |
| *E04C 2/30* | (2006.01) | |
| *E04H 9/14* | (2006.01) | |
| *E04B 1/00* | (2006.01) | |
| *E04C 2/00* | (2006.01) | |

(52) U.S. Cl.
CPC ............ *E04B 1/34321* (2013.01); *E04B 1/3205* (2013.01); *E04B 1/342* (2013.01); *E04B 1/34384* (2013.01); *E04C 2/30* (2013.01); *E04H 9/14* (2013.01); *E04B 2001/0061* (2013.01); *E04B 2001/327* (2013.01); *E04B 2001/3276* (2013.01); *E04C 2002/004* (2013.01)

(58) Field of Classification Search
CPC ..... E04B 1/32; E04B 1/3412; E04B 1/34321; E04B 1/3205; E04H 5/08
USPC ............. 52/86–89, 79.1, 79.4, 80.1; 446/108, 446/111, 115, 118, 120, 121
See application file for complete search history.

(56) References Cited

U.S. PATENT DOCUMENTS

| | | | | |
|---|---|---|---|---|
| 2,933,056 | A * | 4/1960 | Martin | 52/86 |
| 3,464,168 | A * | 9/1969 | Lyons, Jr. et al. | 52/63 |
| 3,748,796 | A * | 7/1973 | Ouellet | 52/86 |
| 4,558,969 | A * | 12/1985 | FitzSimons | 405/124 |
| 5,333,421 | A * | 8/1994 | McKenna | 52/86 |
| 6,151,841 | A | 11/2000 | Green | |
| 6,948,281 | B1 * | 9/2005 | Carmichael | 52/86 |
| 8,082,700 | B2 | 12/2011 | Kennedy et al. | |
| 8,381,454 | B1 | 2/2013 | Robinson | |
| 2013/0227896 | A1 * | 9/2013 | Anderson et al. | 52/86 |

* cited by examiner

*Primary Examiner* — Brian Glessner
*Assistant Examiner* — Adam Barlow
(74) *Attorney, Agent, or Firm* — Crossley Patent Law

(57) ABSTRACT

The portable modular tornado and hurricane survival shelter kit can be quickly constructed, even by a single individual, or left assembled. The shelter provides for shielding people and animals from flying debris, the most frequently injurious danger in severe storms. The shelter's construction is understandable quickly, even to the novice, therein further providing for quick construction. The base slots that hold the flexed arcs differ one to the next so that no confusion between arc A members and overlapping arc B members exists in assembly. Modularity is key element, as various sizes are needed to accommodate varying numbers of occupants. Only differing bases need be used to alter overall human capacity as arc A members and arc B members can continue innumerably by varying only the base length. The shelter is inexpensive in order to be deployed to a plurality of imaginable application sites. Schools are but one example.

15 Claims, 6 Drawing Sheets

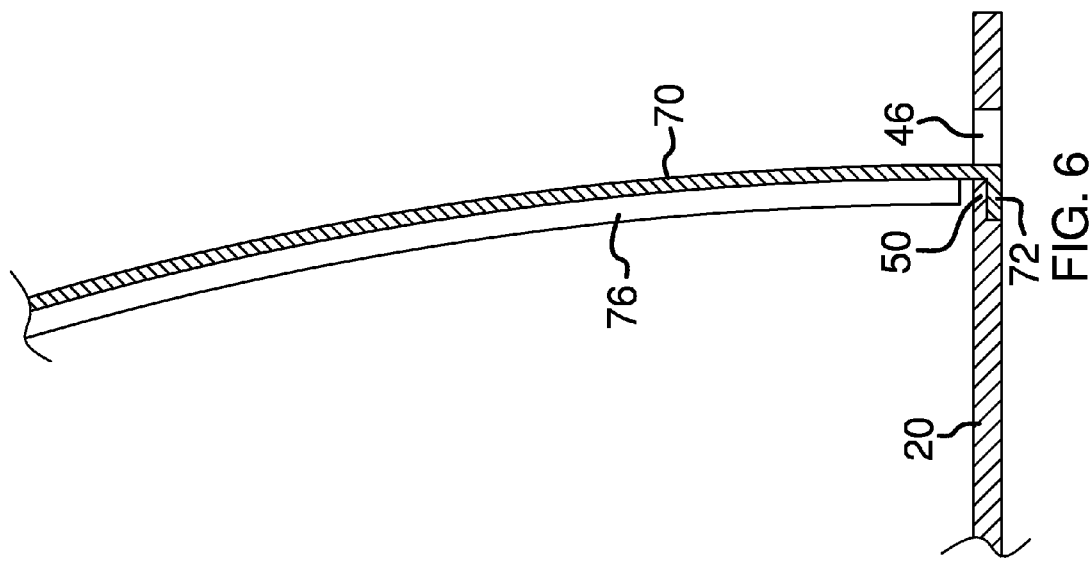
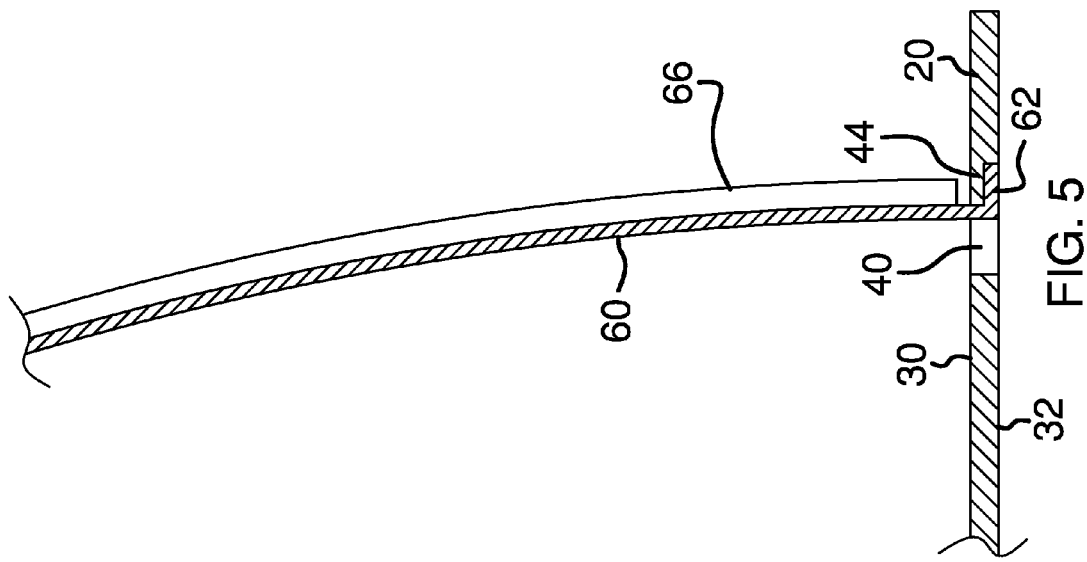

PORTABLE MODULAR TORNADO AND HURRICANE SURVIVAL SHELTER KIT

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Regardless of tornado, hurricane, or serious wind, flying debris is typically the greatest danger to human life and limb. An underground shelter is sometimes the best protection, yet such are not only expensive in terms of space and construction but also must be shielded against flooding. Hurricane Katrina, as example, taught us that an underground shelters could well have been death traps. How would on escape an underground shelter covered by several feet of water? Even if sealed, how long could occupants survive? Above ground shelters can be built to withstand much, yet those employed are often subject also to damage and dangers. The portable modular shelters previously proposed are both too difficult and time consuming to construct and complexity increases costs to often unbearable levels, along with intolerable construction times. What has been needed is a truly portable modular shelter that can be quickly constructed, even by a single individual, or left in place. The shelter's construction must be basically understood instantly, even to the novice. Modularity is another key element, as various sizes are needed to accommodate varying numbers of occupants. The shelter must be inexpensive in order to be deployed to a plurality of imaginable application sites. Schools are but one example. The present portable modular tornado and hurricane survival shelter kit provides these needed advantages.

FIELD OF THE INVENTION

The present portable modular tornado and hurricane survival shelter kit relates to storm shelters and more especially to a portable modular, quickly assemblable tornado and hurricane shelter.

SUMMARY OF THE INVENTION

The general purpose of the portable modular tornado and hurricane survival shelter kit, described subsequently in greater detail, is to provide a hand held fruit and portable modular tornado and hurricane survival shelter kit that has many novel features that result in a portable modular tornado and hurricane survival shelter kit which is not anticipated, rendered obvious, suggested, or even implied by prior art, either alone or in combination thereof.

To accomplish this, the portable modular tornado and hurricane survival shelter kit comprises a modular structure having a base, the base having a first end, a second end opposite the first end, a first side, a second side opposite the first side, a top side, a bottom side opposite the top side. A plurality of mirror image spaced apart slot A pairs are disposed in the top side. A one slot A of each of the slot A pair is disposed proximal the first side. One slot A of each slot A pair is disposed proximal the second side. Each slot A has an slot A length. An inward lock tab is disposed in each slot A.

A plurality of mirror image spaced apart slot B pairs is disposed in the top side. A one slot B of each pair of slot B pair is disposed proximal the first side. One slot B of each slot B pair is disposed proximal the second side. Each slot B has a slot B length. Each slot A length is greater than each slot B length. An outward lock tab is disposed within each slot B.

A plurality of flat sided arc A members is provided. Each arc A member has an arc A width of approximately 8 inches. An outward right angle is disposed on an each end of each arc A member, each outward right angle having an angle A width. A pair of spaced apart arc A edges is disposed on each arc A width. A plurality of interlock ears is provided. An interlock ear is disposed on each arc A edge.

A plurality of flat sided arc B members is provided. Each arc B member has a arc B width of approximately 7 inches. An inward right angle is disposed on an each end of each arc B member. Each inward right angle has a angle B width is less than each angle A width. A pair of spaced apart arc B edges is disposed on each arc B width. An interlock channel is disposed on each arc B edge. One of each arc B member is disposed most proximal the first end. One of each arc B member is disposed most proximal the second end.

Each arc A member and each arc B member is comprised of a material with memory such that flexing sees an effort of each arc A member and each arc B member return to and original shape. One outward right angle on one end of one arc A member is installed into one slot A. The arc A member opposed end is flexed outwardly, the outward right angle installed into the mirror image slot A. The arc A member is then released, therein installing the arc A member into the base mirror image slot As. An opposite procedure is employed to remove each arc A member. One outward right angle on one end of one arc B member is installed into one slot B. The opposed end arc B member is flexed outwardly and the outward right angle installed into the mirror image slot B. The arc B member is then released, therein installing the arc B member into the base. An opposite procedure is employed to remove each arc B member.

A pair of end panels is provided. Each end panel has a shape and a size mimicking a shape and a size of each arc A member. One of each end panel is disposed at the first end. One of each end panel is disposed at the second end. Each end panel is encircled by one of the interlock ears, respectively. Each interlock ear is alternately fitted and removed from one of the interlock channels, respectively. A pair of identical mirror image doors is disposed in one of the end panels.

The differing slot A length relative to the slot B length and the difference in the arc A width relative to the arc B width are important in aiding assembly, as no sorting need be practiced but rather just fitting each appropriate right angle to each appropriate slot. A single individual, even with no knowledge of the shelter, can therefore easily and quickly assemble the shelter. In hurried preparation for an upcoming disaster, this is of primary importance. The locked fit of each end panel further aids hasty construction. With these features, the shelter enables extremely quick construction and can therefore be disassembled and stored in preparation by choice. The modularity of the shelter offers various base dimensions between the first end and the second end to provide for varying numbers of occupants. Further, greater sizes in both base and arc members is provided. If in place retention is desired the bases are easily anchored to most surfaces.

Thus has been broadly outlined the more important features of the present portable modular tornado and hurricane survival shelter kit so that the detailed description thereof that follows may be better understood and in order that the present contribution to the art may be better appreciated.

BRIEF DESCRIPTION OF THE DRAWINGS

Figures

FIG. 5 is a cross sectional view of FIG. 1, taken along the line 5-5.
FIG. 6 is a cross sectional view of FIG. 1, taken along the line 6-6.

DETAILED DESCRIPTION OF THE DRAWINGS

Figure 1:
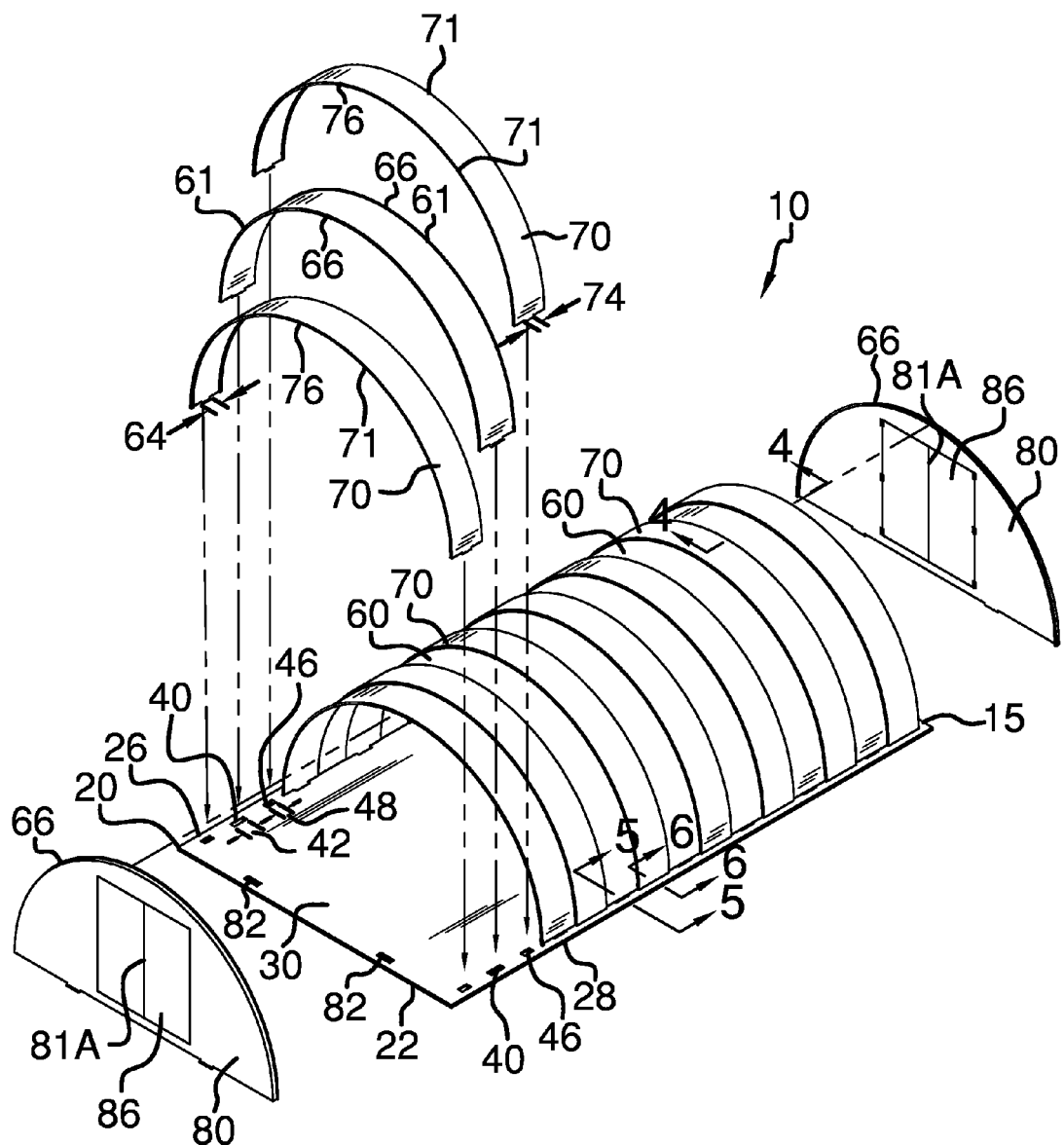
FIG. 1 is a perspective view.
Figure 2:
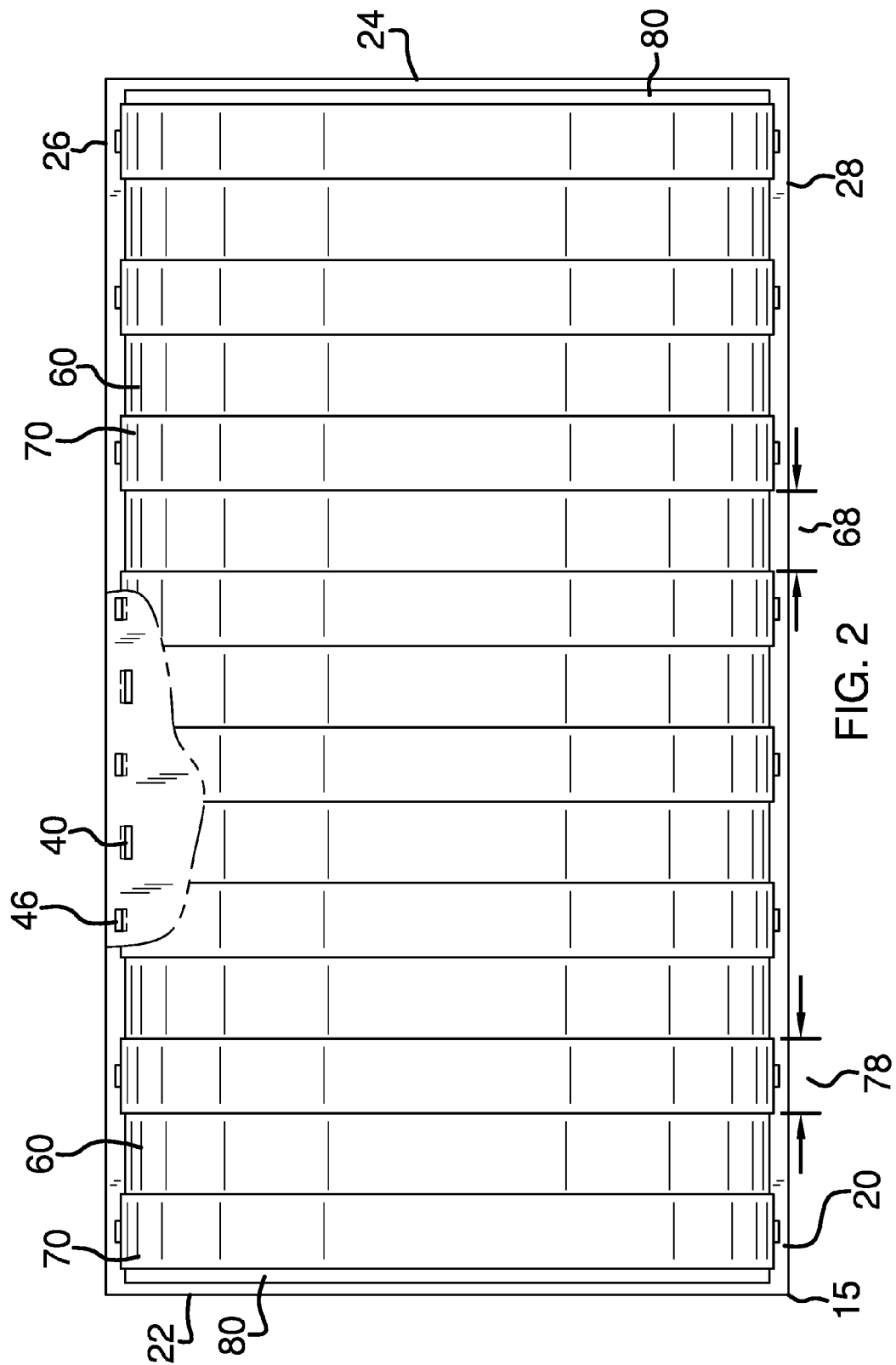
FIG. 2 is a top plan view.
Figure 3:
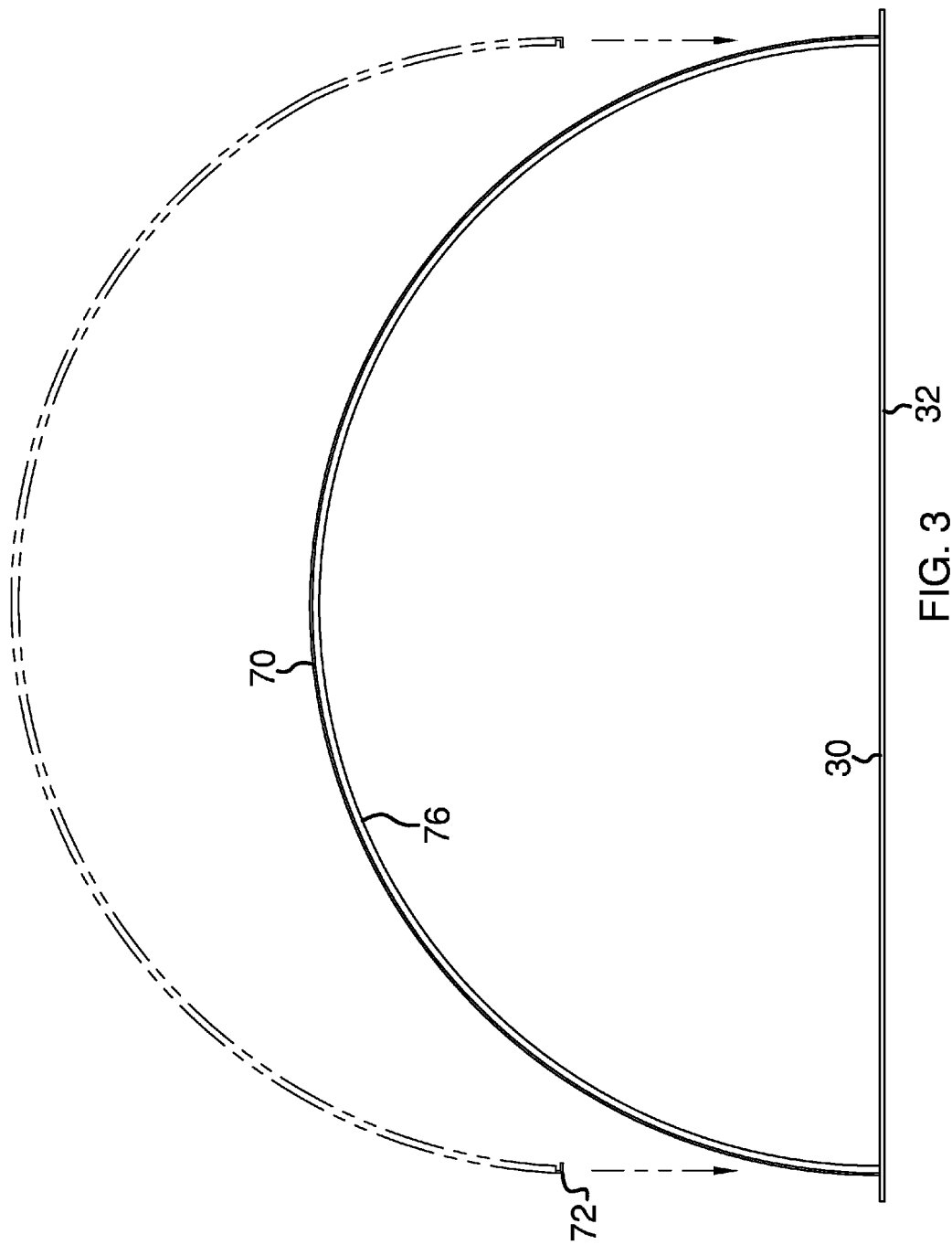
FIG. 3 is an end view.
Figure 4:
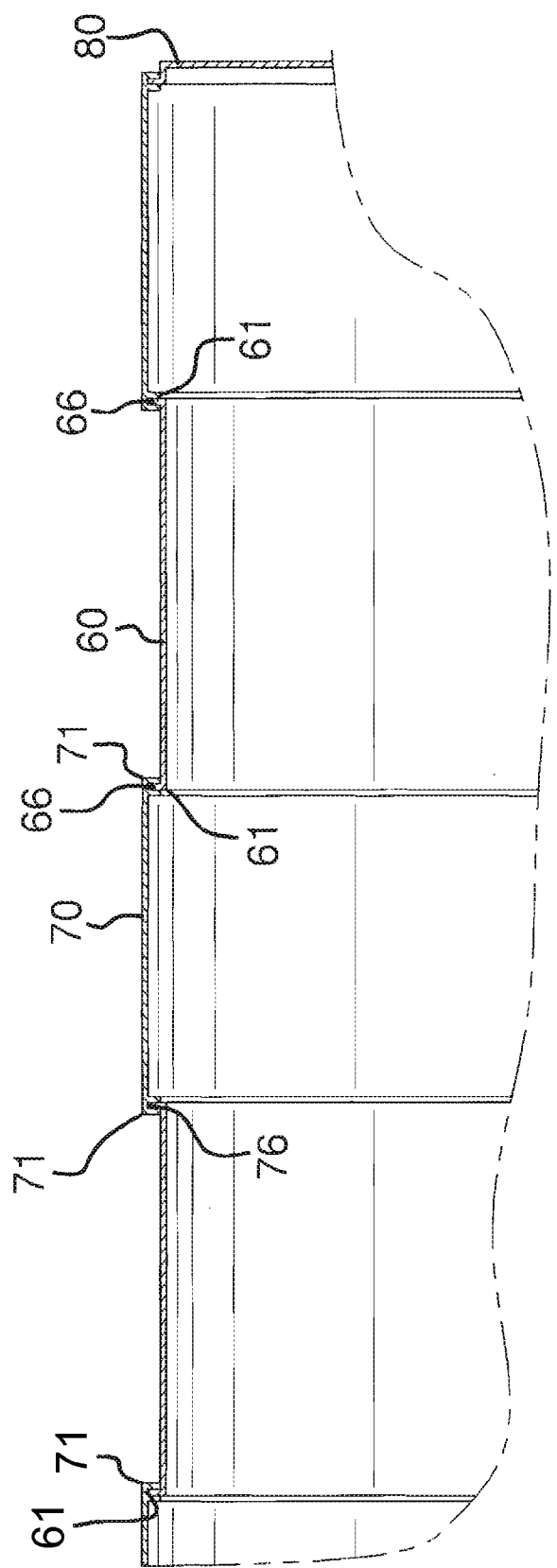
FIG. 4 is a cross sectional view of FIG. 1, taken along the line 4-4.
Figure 7:
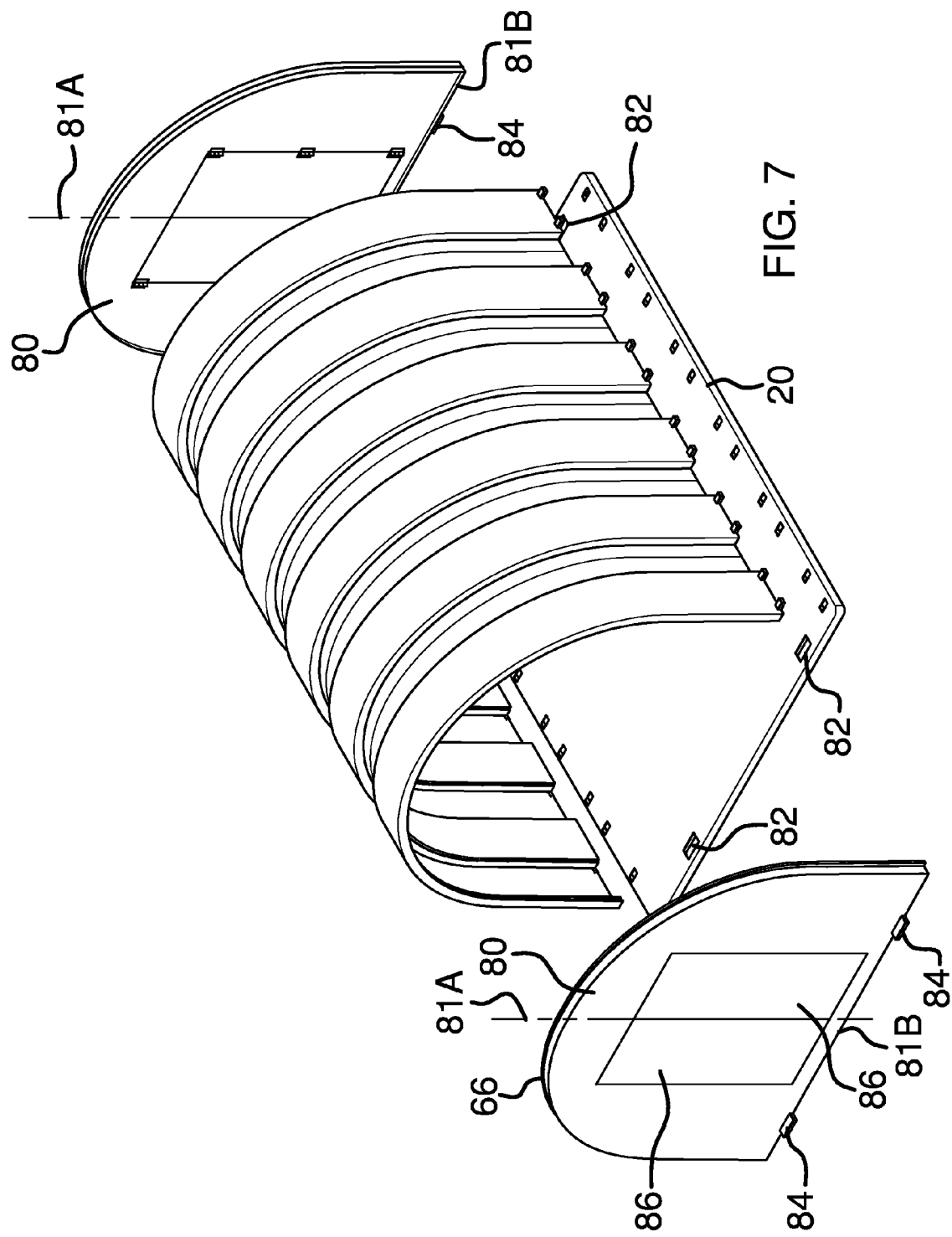
FIG. 7 is a partially exploded perspective view.

With reference now to the drawings, and in particular FIGS. 1 through 7 thereof, an example of the portable modular tornado and hurricane survival shelter kit employing the principles and concepts of the present portable modular tornado and hurricane survival shelter kit and generally designated by the reference number 10 will be described.

Referring to FIGS. 1 through 7, the portable modular tornado and hurricane survival shelter kit 10 comprises a modular structure 15 having a base 20. The base 20 has a first end 22, a second end 24 opposite the first end 22, a first side 26, a second side 28 opposite the first side 26, a top side 30, and a bottom side 32 opposite the top side 30.

A plurality of spaced apart slots A 40 is disposed in the top side 30 in alignment from the first end 22 to the second end 24, the slots A 40 being further arranged in pairs of slots A 40, each pair of slots A 40 being disposed directly across from each other in a position proximal the respective first side 26 and second side 28. Each slot A 40 has a slot A length 42. An inward lock tab 44 is disposed in each slot A 40. A plurality of spaced apart slots B 46 is disposed in the top side 30 in alignment from the first end 22 to the second end 24, the slots B 46 being further arranged in pairs of slots B 46, each pair of slots B 46 being disposed directly across from each other in a position proximal the respective first side 26 and second side 28. Each slot B 46 has a slot B length 48. Each slot A length 42 is greater than each slot B length 48. An outward lock tab 50 is disposed within each slot B 46.

A plurality of flat sided arc A members 60 is provided. Each arc A member 60 has an arc A width 68 of approximately 8 inches. An outward right angle 62 is disposed on an each end of each arc A member 60, each outward right angle 62 having an angle A width 64. A pair of spaced apart arc A edges 61 is disposed on each arc A width 68. A plurality of interlock ears 66 is provided. An interlock ear 66 is disposed on each arc A edge 61.

A plurality of flat sided arc B members 70 is provided. Each arc B member 70 has an arc B width 78 of approximately 7 inches. An inward right angle 72 is disposed on an each end of each arc B member 70. Each outward right angle 72 has an angle B width 74. Each angle B width 74 is less than each angle A width 64. A pair of spaced apart arc B edges 71 is disposed on each arc B width 78. An interlock channel 76 is disposed on each arc B member edge 71. One arc B member 70 is disposed most proximal the first end 22. One arc B member 70 is disposed most proximal the second end 24.

Each arc A member 60 and each arc B member 70 is formed of a material with a shape memory such that flexing results in an effort of each arc A member 60 and each arc B member 70 to return to an original shape. One outward right angle 62 on a one end of one arc A member 60 is installed into one slot A 40. An opposed end of the same arc A member 60 is flexed outwardly, one outward right angle 62 engaged into the mirror image slot A 40. The arc A member 60 is then released, therein engaging the arc A member 60 into the base 20 mirror image slot As 40. An opposite procedure is employed to remove each arc A member 60. One inward right angle 72 on a one end of one arc B member 70 is engaged into one slot B 46. An opposed arc B member 70 end is flexed outwardly and the inward right angle 72 engaged into the mirror image slot B 46. The arc B member 70 is then released, therein engaging the arc B member 70 into the base 20. An opposite procedure is employed to remove each arc B member 70 from the base 20.

A pair of end panels 80 is provided. Each end panel 80 has an exterior shape and size mimicking a shape and size of each arc A member 60. Each end panel 80 partially comprises a midline 81A extended through each panel to a bottom edge 81B. A pair of spaced apart panel ears 84 is disposed on a bottom edge 81B of each end panel 80. One of each end panel 80 is disposed at each of the first end 22 and the second end 24. A pair of spaced apart panel slots 82 is disposed at each of the first end 22 and second end 24. The panel slots 82 are spaced between the first side 26 and the second side 28. Each end panel 80 is partially encircled by one of the interlock ears 66, the interlock ear 66 not being extended along the bottom edge 81B. Each interlock ear 66 engages and alternately disengages one of the interlock channels 76. Each panel ear 84 engages and alternately disengages one of the panel slots 82, respectively.

A pair of identical doors 86 is disposed in at least one of the end panels 80, each door 86, the doors 86 opening at the midline 81A, wherein one door 86 opening and two coinciding door 86 openings are selectively chosen.

What is claimed is:
1. A portable modular tornado and hurricane survival shelter kit comprising:
  a modular structure having a base, the base having a first end, a second end opposite the first end, a first side, a second side opposite the first side, a top side, a bottom side opposite the top side;
  a plurality of spaced apart slot pairs disposed in the top side in alignment from the first end to the second end, the slots being further arranged in pairs of slots, each pair of slots being disposed directly across from each other in a position proximal the respective first side and second side;
  a lock tab disposed within each slot;
  a plurality of flexible arcs, each arc having a right angle disposed on an each end, each arc having a shape memory;
  wherein upon a flexing of each arc, each arc engages and alternately disengages one of each right angle of the lock tabs within a respective one of the pair of slots;
  a pair of end panels, each end panel fitting into a space between the top side of the base and a bottom side of an arc, one of each end panel disposed at the first end, one of each end panel disposed at the second end, each end panel being removably fitted to the base; and
  at least one door, wherein the at least one door is disposed in one of the end panels;

wherein each end panel is overlapped by one of the flexible arcs.

2. The shelter of claim 1 wherein the base further comprises:
   a pair of spaced apart panel slots disposed at each of the first end and second end;
   a bottom edge disposed on each end panel; and
   a pair of spaced apart panel ears disposed on each bottom edge; and
   wherein each pair of panel ears removably engages a respective one of the pair of panel slots; and
   wherein upon the removable engagement of each pair of panel ears to the respective pair of panel slots, each panel is removably fitted to the base.

3. The shelter of claim 1 wherein the base is flat; and wherein each bottom edge is flat.

4. The shelter of claim 1 wherein each arc member is flat sided.

5. The shelter of claim 1 wherein each arc member abuts an adjacent arc member.

6. The shelter of claim 1 wherein the at least one door comprises a pair of identical doors disposed in one of each of the end panels.

7. The shelter of claim 2 wherein each arc member is flat sided.

8. The shelter of claim 2 wherein the base is flat; and wherein each bottom edge is flat.

9. The shelter of claim 2 wherein the at least one door comprises a pair of identical doors disposed in one of each of the end panels.

10. The shelter of claim 3 wherein the at least one door comprises a pair of identical doors disposed in one of each of the end panels.

11. The shelter of claim 3 wherein the base further comprises:
    a pair of spaced apart panel slots disposed at each of the first end and second end;
    a bottom edge disposed on each end panel; and
    a pair of spaced apart panel ears disposed on each bottom edge; and
    wherein each pair of panel ears removably engages a respective one of the pair of panel slots; and
    wherein upon the removable engagement of each pair of panel ears to the respective pair of panel slots, each panel is removably fitted to the base.

12. The shelter of claim 4 wherein the base further comprises:
    a pair of spaced apart panel slots disposed at each of the first end and second end;
    a bottom edge disposed on each end panel; and
    a pair of spaced apart panel ears disposed on each bottom edge; and
    wherein each pair of panel ears removably engages a respective one of the pair of panel slots; and
    wherein upon the removable engagement of each pair of panel ears to the respective pair of panel slots, each panel is removably fitted to the base.

13. The shelter of claim 4 wherein the at least one door comprises a pair of identical doors disposed in one of each of the end panels.

14. The shelter of claim 5 wherein the base further comprises:
    a pair of spaced apart panel slots disposed at each of the first end and second end;
    a bottom edge disposed on each end panel; and
    a pair of spaced apart panel ears disposed on each bottom edge; and
    wherein each pair of panel ears removably engages a respective one of the pair of panel slots; and
    wherein upon the removable engagement of each pair of panel ears to the respective pair of panel slots, each panel is removably fitted to the base.

15. The shelter of claim 5 wherein the at least one door comprises a pair of identical doors disposed in one of each of the end panels.

* * * * *